WIDE BAND RECORDING AND REPRODUCING SYSTEM

Original Filed Dec. 23, 1965

Inventor:
HENRY RAY WARREN

By Eugene M. Whitten
Attorney

United States Patent Office

Re. 27,734
Reissued Aug. 14, 1973

27,734

WIDE BAND RECORDING AND REPRODUCING SYSTEM

Henry Ray Warren, Indianapolis, Ind., assignor to RCA Corporation

Original No. 3,482,038, dated Dec. 2, 1969, Ser. No. 515,931, Dec. 23, 1965. Application for reissue Nov. 24, 1971, Ser. No. 202,044
Int. Cl. G11b *5/04;* H04n *5/78*
U.S. Cl. 178—6.6 A 12 Claims

Matter enclosed in heavy brackets [ ] appears in the original patent but forms no part of this reissue specification; matter printed in italics indicates the additions made by reissue.

ABSTRACT OF THE DISCLOSURE

A television signal to be recorded is divided into its video and audio information signals. The video signal is used to frequency modulate a carrier wave. The resultant frequency modulated carrier wave is then added to the audio signal and applied to a recording head for recording on a single track of a magnetic tape.

This invention relates to wide band recording and reproducing systems and particularly to a system for recording and reproducing two separate channels of information.

In the past, systems for recording two separate signals have utilized a separate tape track for each channel. An example of this is found in television recording systems wherein the video information is impressed on one track of a magnetic tape and the audio components corresponding thereto are recorded on a second or separate track of the magnetic tape. One of the chief drawbacks in this type of system is the necessity for two distinct tracks. This reduces the usable area of the tape.

It is therefore an object of the present invention to provide an improved system for recording and reproducing two separate channels of information in a single track of a recording medium.

Another object of the present invention is to provide an improved system for recording and reproducing an entire television signal including accompanying sound in a single track of a recording medium.

The invention is applicable generally to systems in which it is desirable to record two separate channels of information on a magnetic tape. Since a television signal recording and reproducing system necessarily involves the recording of two independent channels of information, the invention, will be described with specific reference to such a system.

According to one form of the present invention adapted for use in television recording a television signal to be reproduced is divided into its video and audio information signals. The video signal is used to frequency modulate a carrier wave. The resultant frequency modulated carrier wave is then added to the audio signal and applied to a recording head for recording on a single track of a magnetic tape.

In accordance with one embodiment of the playback portion of the invention, the audio information contained in the recorded signal is recovered by means of a conventional audio playback head. The gap length of the head is such that its acts as a natural filter to the frequency modulated portion of the recorded signal and is of small enough length to be responsive to the audio portion of the recorded signal. The frequency modulated video portion of the recorded signal is then recovered by means of a second playback head having a gap of small enough length to be responsive to frequencies in the spectrum associated with the frequency modulated video portion of the recorded signal. The signal from the second playback head is then applied to a suitable FM demodulator for recovery of the video signal from the frequency modulated wave in a manner known in the art. The video and audio signals may then be combined or separately applied to a transmission means or television monitor for viewing as is desired.

The novel features which are believed to be characteristic of the invention are set forth with particularity in the appended claims. The invention itself both as to its organization and method of operation as well as further objects and advantages thereof will be better understood from the following description when read in conjunction with the accompanying drawings in which:

Figures 1, 2, 3:
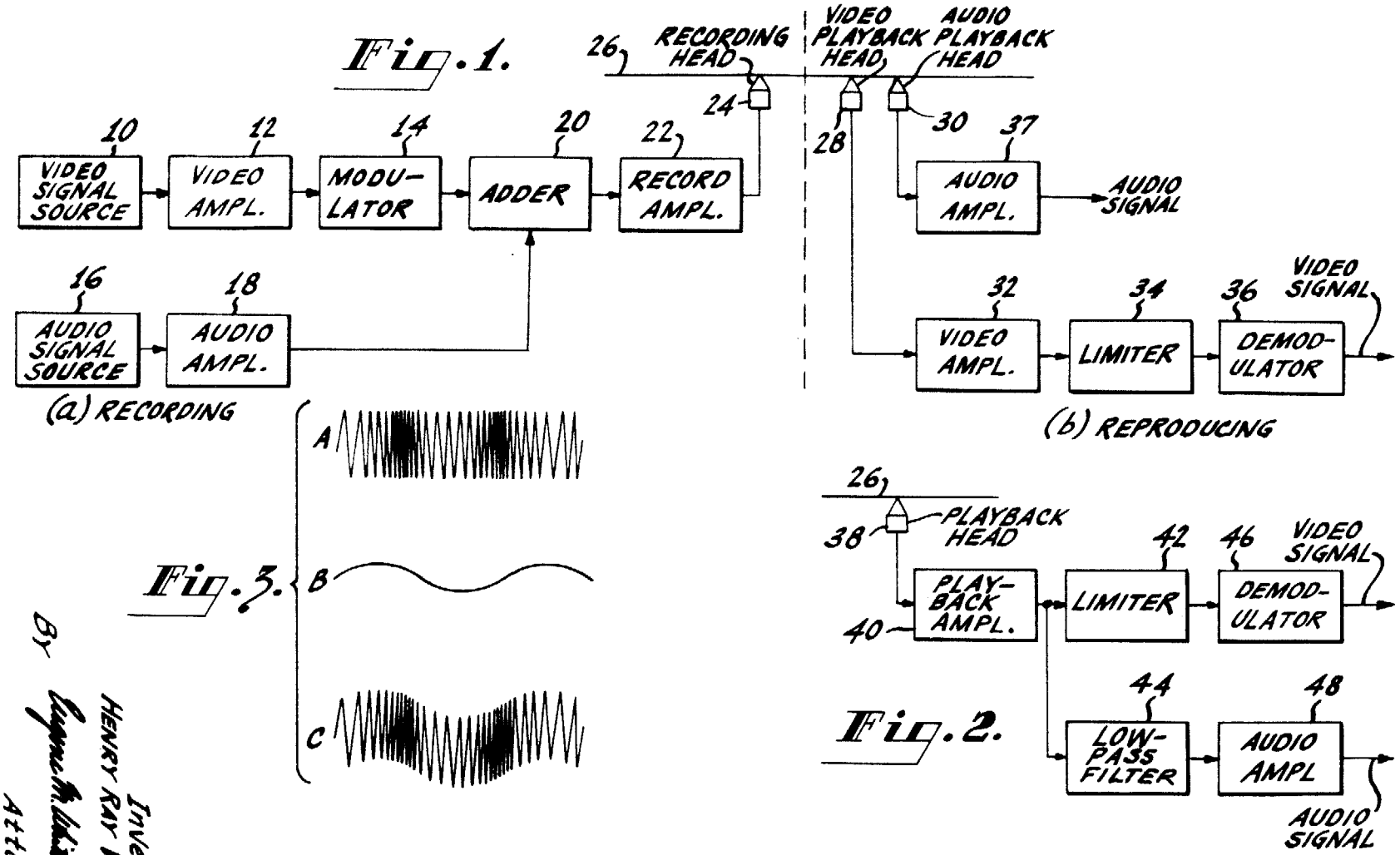
FIGURE 1 is a block diagram showing a system for recording and reproducing a television signal in accordance with the present invention.
FIGURE 2 is a block diagram showing another form of the reproducing system of the present invention.
FIGURE 3 is a wave form diagram useful in the description and understanding of the present invention.

The present invention will be explained in the context of a television signal recording and reproducing system with reference principally to those parts of the system which invlove the processing and application of audio and video signal information to a recording head, as well as playback means for the reproduction of the recorded signal and its subsequent processing to obtain the audio and video information. It is to be understood, however, that the fundamental concepts to be described are more generally applicable. For example, the recording and reproduction of the video and sweep information signals used in a radar display.

Any description of the capstan and drive mechanism associated with magnetic recorders, the details of which are known in the art but which have no bearing on the present invention have been omitted.

The left hand portion of FIGURE 1 shows the recording portion of the system. A video signal source 10, which may comprise the video detector of a conventional television receiver is coupled to a video amplifier 12. After amplification, the video signal is used to frequency modulate a carrier wave in a modulator 14 in accordance with known techniques. The video frequency modulated carrier wave is then fed to an adder circuit 20 for combination with an audio signal as will be hereinafter described.

An audio signal source 16 of the television signal is coupled to an audio amplifier 18. The audio signal source 16 may comprise the sound demodulator of a television receiver. After amplification, the audio signal is additively combined in the adder circuit 20 with the modulated carrier wave output from the modulator 14 to provide a composite signal. The added 20 may comprise a resistive circuit including a resistor having both the output of the modulator 14 and the audio amplifier 18 applied thereto. The addition of the audio and video frequency modulated carrier signals is such that it causes the envelope of the modulated carrier wave to follow the variations of the audio signal (the amplitude of the carrier wave remaining constant), thus providing a composite signal carrying both the audio and video signal portions of the television signal. This composite signal is then amplified in a recording amplifier 22 and applied to a magnetic recording head 24 for recording on a magnetic tape 26.

Referring now to FIGURE 3, there is shown a frequency modulated video signal in waveform A. This waveform appears at the output of the modulator 14. Waveform B represents the relatively low frequency or audio output from the amplifier 18. Waveform C indicates the output signal which is obtained from the adder 20 and which is impressed on the magnetic tape 26. It will will be observed that waveform C is the additive combination of waveform B and waveform A and that the FM carrier wave as applied to the recording head 24 serves as an A-C bias voltage for the audio signal. Linearity of the low frequency audio signal, when recorded on the magnetic tape is therefore achieved by the "A-C" biasing" action of the video frequency FM modulated carrier wave.

It will be noted that instead of frequency modulation, amplitude or phase modulation may be used to translate the video signal on to a carrier wave. Thus, the block 14 is referred to in FIGURE 1 as a modulator so as to be representative of either a frequency modulator, a phase modulator, or an amplitude modulator. It will be noted that the audio signal can be amplitude, phase or frequency modulated prior to being added to the frequency modulated carrier wave. Hence, if desired, the block 18 may also include suitable modulator apparatus for amplitude, phase or frequency modulating the audio signal. Thus in accordance with the invention a first signal to be recorded is used to modulate a carrier wave. This modulated carrier wave then serves as an A-C bias for a second signal to be recorded; and this second signal may be unmodulated or may be a carrier wave amplitude, phase or frequency modulated by the desired signal information.

Referring now to the right hand side of FIGURE 1, one embodiment of the reproducing system of the present invention is illustrated. The magnetic tape containing the impressed composite signal is caused to be successively passed over a video playback head 28 and an audio playback head 30. It will be noted that the sequential arrangement of the video and audio heads 28 and 30 as shown in FIGURE 1 may be interchanged.

The video playback head 28 is of any suitable design and has a gap length sufficiently small so as to enable it to resolve the video frequency modulated FM carrier wave composite signal impressed on the tape into a corresponding electrical signal. The output of the video head 28 is amplified in a video playback amplifier 32 and then passed through a suitable limiter circuit 34 wherein any noise or amplitude variations of the signal are removed. From the limiter 34 the signal is fed to an FM demodulator 36 in which a video signal corresponding to the original recorded video signal is produced. The demodulator 36 may be of any suitable design and operates in a manner understood by those skilled in the art.

The audio playback head 30 may be of any suitable design and has a gap length of sufficient dimension to resolve the amplitude variations of the recorded signal constituting the audio portion of the recorded information into an electrical signal output. Thus, this gap length will be too large to effectively resolve the video frequency modulated carrier and as such serves to filter the FM carrier waves while resolving the audio signal.

The output signal from the audio playback head 30 is coupled to an audio playback amplifier 37 wherein the signal is amplified and equalized, if necessary, to provide an audio output signal corresponding to the originally recorded audio signal.

FIGURE 2 shows another embodiment of the reproducing system of the invention compatible with the recording system of FIGURE 1 for reproducing the audio and video signal portions of the recorded composite signal. The system operates as follows.

The composite signal impressed on the magnetic tape 26 is converted into a corresponding electrical signal by a video playback head 38 and then amplified in a playback amplifier 40. It will be understood that the gap length of the playback head 38 is sufficiently small so as to faithfully reproduce the recorded amplitude varying video frequency FM modulated carrier wave signal.

The output signal from the amplifier 40 is then channeled to the respective input terminals of a limiter circuit 42 and a low pass filter 44. The limiter 42 removes the amplitude variations of the signal and then passes the signal to an FM demodulator 46 wherein the video signal portion of the composite signal is recovered.

The signal channeled to the low pass filter 44 is therein stripped of the video frequency modulated carrier wave so as to reproduce the audio signal portion contained therein. The audio signal is then coupled to an audio amplifier 48 wherein it is amplified and equalized to provide the response required.

What is claimed is:

1. Apparatus for recording signals on a magnetic medium comprising:

first input means adapted to receive a video signal;

second input means adapted to receive an audio signal;

means coupled to said first input means for producing a first carrier wave modulated by said video signal;

means coupled to said second input means and to said first carrier wave producing means for additively combining said first modulated carrier wave and said audio signal to produce a [second] *resultant* modulated carrier wave [having an envelope] which varies according to said audio signal; and means for recording said [second] *resultant* modulated carrier wave on said magnetic medium.

2. The combination defined in claim 1 wherein said first carrier wave is modulated in frequency by said video signal.

3. The combination defined in claim 1 wherein said first carrier wave is modulated in phase by said video signal.

4. The combination defined in claim 1 wherein said first carrier wave is modulated in amplitude by said video signal.

5. In a system for the reproduction of audio and video signals [recorded on a magnetic medium in the form of a composite signal which comprises the additive combination of said audio signal and a carrier wave modulated by said video signal], the combination of:

*a magnetic medium having audio and video signals recorded thereon in the form of a composite signal which comprises the additive combination of said audio signal and a carrier wave modulated by said video signal;* means including a transducer for reproducing from said magnetic medium a signal corresponding to said audio signal;

means including a transducer for reproducing from said magnetic medium a signal corresponding to said carrier wave modulated by said video signal; and means coupled to the output of said last mentioned means for deriving a signal corresponding to *said* video signal.

6. In a system for the reproduction of audio and video signals [recorded on a magnetic medium in the form of a composite signal which comprises the additive combination of said audio signal and a carrier wave modulated by said video signal], the combination of:

*a magnetic medium having audio and video signals recorded thereon in the form of a composite signal which comprises the additive combination of said audio signal and a carrier wave modulated by said video signal;* means including a transducer for reproducing from said magnetic medium said composite signal;

first detecting means coupled to the output of said means including a transducer for deriving a signal corresponding to said audio signal; and second detecting means coupled to the output of said means including a transducer deriving a signal corresponding to said video signal.

*7. Apparatus for recording signals on a magnetic medium having a non-linear transfer characteristic, comprising:*

*first input means adapted to receive a first signal;*

*second input means adapted to receive a second signal;*

*means coupled to said first input means for producing a first carrier wave modulated by said first signal, said first modulated carrier wave sufficiently greater in frequency than said second signal and of an amplitude such that it is suitable as an AC bias signal for linearly recording said second signal on said magnetic medium notwithstanding its non-linear transfer characteristic;*

*means coupled to said second input means and to said first carrier wave producing means for additively combining said first modulated carrier wave and said second signal to produce a resultant modulated carrier wave which varies according to said second signal such that said first modulated carrier wave provides an AC bias voltage for said second signal; and*

*means for recording said resultant modulated carrier wave in a single track on said magnetic medium without a separate source of bias signals.*

*8. Apparatus for recording information components of a television signal on a magnetic medium having a non-linear transfer characteristic, comprising:*

*first input means adapted to receive a first information component of said television signal;*

*second input means adapted to receive a second information component of said television signal;*

*means coupled to said first input means for producing a first carrier wave modulated by said first information component of said television signal, said first modulated carrier wave sufficiently greater in frequency than said second information component and of an amplitude such that it is suitable as an AC bias signal for linearly recording said second information component on said magnetic medium notwithstanding its non-linear transfer characteristic;*

*means coupled to said second input means and to said first carrier wave producing means for additively combining said first modulated carrier wave and said second information component of said television signal to produce a resultant modulated carrier wave which varies according to said second information component of said television signal such that said first modulated carrier wave provides an AC bias voltage for said second information component of said television signal; and*

*means for recording said resultant modulated carrier wave on said magnetic medium without a separate source of bias signals.*

*9. Apparatus for recording information components of a television signal on a magnetic medium having a non-linear transfer characteristic as defined in claim 8 wherein said first carrier wave is modulated in frequency by said first information component of said television signal.*

*10. Apparatus for recording information components of a television signal on a magnetic medium having a non-linear transfer characteristic as defined in claim 8 wherein said first carrier wave is modulated in phase by said first information component of said television signal.*

*11. Apparatus for recording information components of a television signal on a magnetic medium having a non-linear transfer characteristic as defined in claim 8 wherein said first information component of said television signal is a video signal.*

*12. Apparatus for recording information components of a television signal on a magnetic medium having a non-linear transfer characteristic as defined in claim 11 wherein said first carrier wave is modulated in frequency by said video signal.*

References Cited

The following references, cited by the Examiner, are of record in the patented file of this patent or the original patent.

UNITED STATES PATENTS

| | | | |
|---|---|---|---|
| 2,909,596 | 10/1959 | Fay | 178—6.6 A |
| 3,403,221 | 9/1968 | Van Den Bussche | 178—6.6 A |
| 3,506,780 | 4/1970 | Camras | 178—6.6 A |
| 3,278,678 | 10/1966 | Rank | 178—6.6 A |

OTHER REFERENCES

Black, Harold S.: Modulation Theory, Princeton, D. Van Nostrand Co. Inc., 1953, p. 25.

HOWARD W. BRITTON, Primary Examiner

U.S. Cl. X.R.

179—100.2 MD